(12) United States Patent
El-Haddad et al.

(10) Patent No.: US 12,093,450 B2
(45) Date of Patent: Sep. 17, 2024

(54) SCANNING DISPLAY WITH EYE-TRACKING

(71) Applicant: Meta Platforms Technologies, LLC, Menlo Park, CA (US)

(72) Inventors: Mohamed Tarek Ahmed El-Haddad, Redmond, WA (US); Babak Amirsolaimani, Redmond, WA (US); Francesco Larocca, Kirkland, WA (US); Yang Yang, Redmond, WA (US); Junjie Hu, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/972,908

(22) Filed: Oct. 25, 2022

(65) Prior Publication Data
US 2024/0134447 A1 Apr. 25, 2024
US 2024/0231479 A9 Jul. 11, 2024

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 2027/0174* (2013.01); *G02B 2027/0178* (2013.01)

(58) Field of Classification Search
CPC .............. G06F 3/013; G02B 27/0172; G02B 2027/0174; G02B 2027/0178
See application file for complete search history.

(56) References Cited

U.S. PATENT DOCUMENTS

| | | | |
|---|---|---|---|
| 10,394,034 B2 * | 8/2019 | Reshidko | G06V 40/197 |
| 10,732,427 B2 | 8/2020 | Wall et al. | |
| 11,782,268 B2 * | 10/2023 | Ren | G02B 27/0093 345/8 |
| 2013/0077049 A1 * | 3/2013 | Bohn | G02B 27/0093 351/210 |
| 2013/0106674 A1 * | 5/2013 | Wheeler | G06F 3/013 345/8 |
| 2018/0149874 A1 * | 5/2018 | Aleem | G02B 27/0093 |
| 2019/0018485 A1 * | 1/2019 | Aleem | G06F 3/147 |
| 2019/0050051 A1 * | 2/2019 | Cirucci | H04N 25/40 |
| 2019/0056599 A1 * | 2/2019 | Reshidko | G02B 27/0172 |
| 2019/0369253 A1 * | 12/2019 | Aleem | G01S 17/66 |
| 2020/0249754 A1 * | 8/2020 | Morozov | G02B 6/0023 |
| 2020/0285848 A1 * | 9/2020 | Price | G02B 27/30 |
| 2022/0050292 A1 | 2/2022 | Amirsolaimani et al. | |
| 2022/0146824 A1 * | 5/2022 | Ren | G02B 27/0172 |

OTHER PUBLICATIONS

Co-pending U.S. Appl. No. 17/832,081, inventors Larocca; Francesco et al., filed Jun. 3, 2022.

* cited by examiner

*Primary Examiner* — Dmitriy Bolotin
(74) *Attorney, Agent, or Firm* — Freestone Intellectual Property Law PLLC; Aaron J. Visbeek

(57) ABSTRACT

Image light is generated with a display light source. The image light is visible. An infrared light source emits infrared light. A scan directs the image light and the infrared light to an input coupler of a display waveguide and the display waveguide presents the image light to an eyebox region as a virtual image.

20 Claims, 10 Drawing Sheets

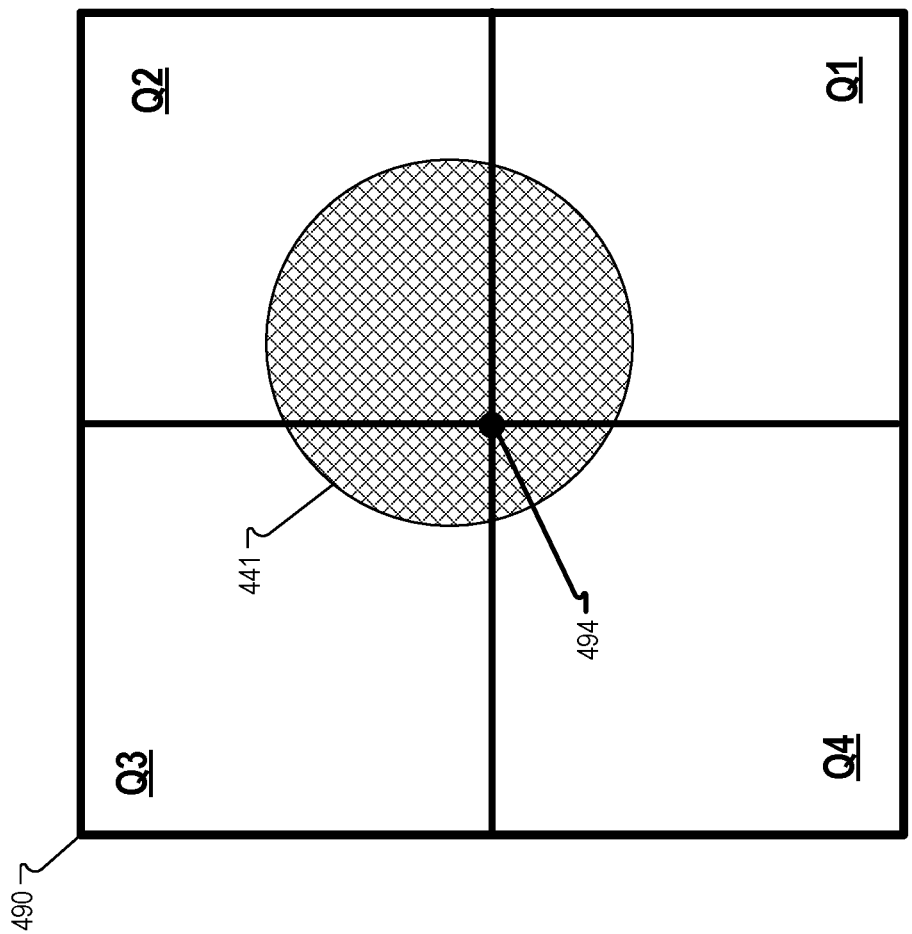

SCANNING DISPLAY WITH EYE-TRACKING

TECHNICAL FIELD

This disclosure relates generally to optics, and in particular to near-eye imaging.

BACKGROUND INFORMATION

Virtual reality (VR), augmented reality (AR), and mixed reality (MR) devices may utilize eye-tracking to enhance the user experience and increase functionality. Some eye-tracking systems illuminate an eyebox region with one or more LEDs and then image the eyebox region using temple-mounted cameras. Head mounted displays (HMDs) also present virtual images to the user. Electrical power and processing resources may be limited in head mounted devices in some contexts.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 4A-4F illustrate event-photodetectors arranged in an Around-The-Lens configuration of a head mounted device, in accordance with aspects of the disclosure

DETAILED DESCRIPTION

Figure 1:
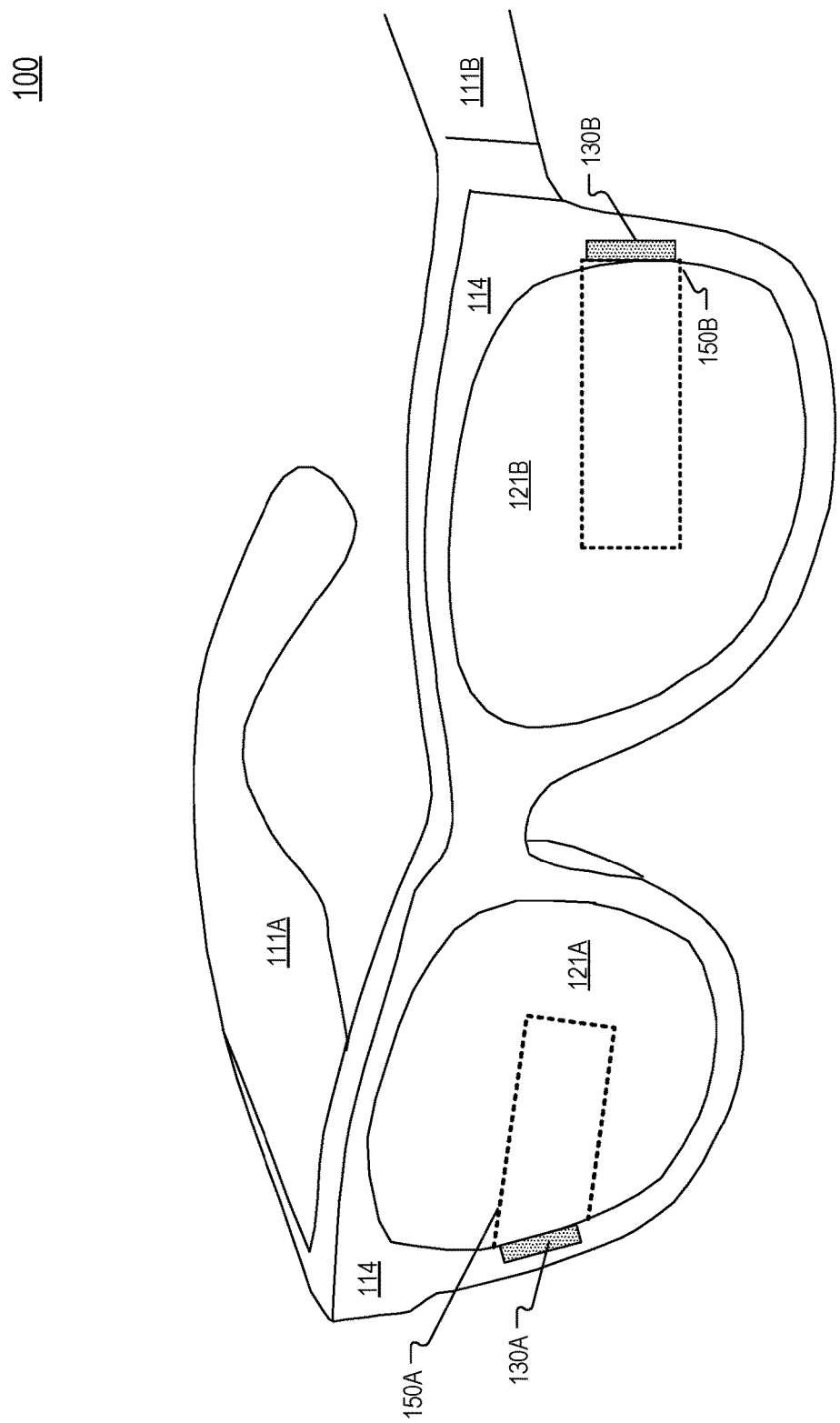
FIG. 1 illustrates a head mounted display (HMD) that may include a near-eye system, in accordance with aspects of the disclosure.

Embodiments of scanning displays with eye-tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

Previous eye-tracking systems may include light sources to facilitate wide-field illumination of an eyebox region with infrared light and a camera-based detection system to image the eyebox region. The eye-tracking image captured by the camera-based system is then analyzed to extract gaze and/or pupil location. These eye-tracking systems may require electrical power to illuminate the light sources and also processing resources to facilitate image analysis. The image analysis may be slower than desirable for a target tracking speed and/or require significant processing resources.

Implementations of the disclosure include a near-eye system that integrates a scanning display and an eye-tracking system. A scanner such as a micro-electro-mechanical systems (MEMS) mirror may scan image light and infrared light to an eyebox region. The image light scanned to the eyebox region is for presenting a virtual image to a user and the infrared light illuminates the eyebox region for eye-tracking purposes. The near-eye system may be considered a "double-pass" system in implementations where a sensor (e.g. a photodiode) is included to generate a tracking signal in response to returning infrared light that propagates along a reverse optical path of the infrared light that was scanned to the eyebox region by the scanner. The plurality of tracking signals at different scan points can be aggregated together to generate an eye-tracking image. In some implementations, an input coupler of a display waveguide incouples the (visible) image light to the display waveguide and directs (e.g. passing or diffracting) infrared light to an eye-tracking waveguide. Utilizing the same scanner for the display and eye-tracking systems may simplify calibration and registration with the display decreases power consumption, decrease weight, and reduce the dimensions of a HMD, for example. These and other embodiments are described in more detail in connection with FIGS. 1-5.

FIG. 1 illustrates a head mounted display (HMD) 100 that may include a near-eye system, in accordance with aspects of the present disclosure. HMD 100 includes frame 114 coupled to arms 111A and 111B. Lens assemblies 121A and 121B are mounted to frame 114. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1, each lens assembly 121A/121B includes a waveguide 150A/150B to direct image light generated by a displays 130A/130B to an eyebox area for viewing by a user of HMD 100. Displays 130A/

130B may include a beam-scanning display or a liquid crystal on silicon (LCOS) display for directing image light to a wearer of HMD 100, for example.

Lens assemblies 121A and 121B may appear transparent to a user to facilitate augmented reality or mixed reality to enable a user to view scene light from the environment around her while also receiving image light directed to their eye(s) by, for example, waveguides 150. Lens assemblies 121A and 121B may include two or more optical layers for different functionalities such as display, eye-tracking, and optical power. In some embodiments, display light from display 130A or 130B is only directed into one eye of the wearer of HMD 100. In an embodiment, both displays 130A and 130B are used to direct image light into waveguides 150A and 150B, respectively.

Frame 114 and arms 111 may include supporting hardware of HMD 100 such as processing logic, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Figure 2A:
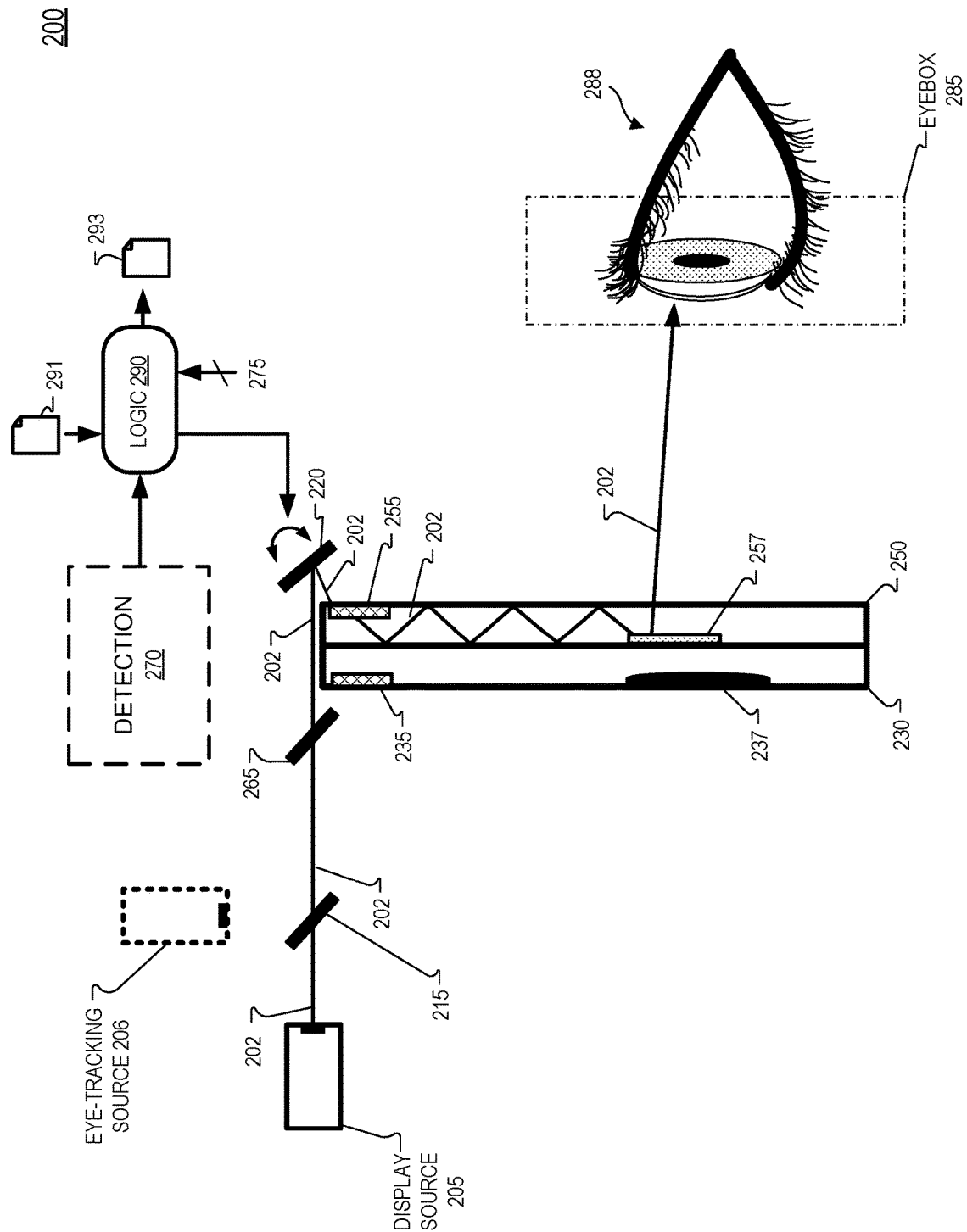
FIG. 2A illustrates a display optical path of a near-eye system, in accordance with aspects of the disclosure.

FIG. 2A illustrates a display optical path of a near-eye system 200, in accordance with implementations of the disclosure. Example near-eye system 200 may be included in HMD 100 to display virtual images to a user and for eye-tracking functionality. Example near-eye system 200 includes a display light source 205, an eye-tracking light source 206, a scanner 220, a display waveguide 250, an eye-tracking waveguide 230, a detection module 270, and processing logic 290. Display light source 205 may include one or more light sources. Display light source 205 may include a red light source, a green light source, and a blue light source, for example. Display light source 205 may include one or more lasers.

In operation, display light source 205 emits image light 202. Image light 202 includes visible light. At least a portion of image light 202 propagates through optical element 215 and optical element 265 and continues to scanner 220 as image light 202. Optical element 215 may be a dichroic reflector that passes visible light and reflects infrared light. Optical element 265 may be a beam splitter that passes a portion of light and reflects a remaining portion of light. Optical element 265 may be a 50/50 beam splitter, in some implementations. Optical element 265 may be configured as a dichroic beam splitter that passes visible wavelengths (e.g. image light 202) and splits a portion of infrared light (e.g. the wavelength of infrared light 207). In some implementations, optical element 265 is disposed between optical element 215 and eye-tracking source 206 so that image light 202 does not encounter optical element 265 in near-eye system. In this implementation, optical element 265 may be a beam splitter that is angled to reflect/direct a portion of returning infrared light to detection module 270.

Scanner 220 receives image light 202 and directs image light 202 to input coupler 255 of display waveguide 250 at varying scan angles, although a single scan angle is illustrated in FIG. 2A for descriptive purposes. Input coupler 255 may be holographic optical element (HOE). Input coupler 255 incouples image light 202 into display waveguide 250 to present a virtual image to an eyebox region 285 to be viewable by and eye 288 of a user of an HMD (e.g. HMD 100). In an implementation, input coupler 255 is configured to diffract visible light at a diffraction angle that allows display waveguide 250 to confine the image light 202 to propagate within display waveguide 250 by way of total internal reflection (TIR). Image light 202 propagates in display waveguide 250 until encountering a display output coupler 257. Display output coupler 257 may be configured to cause image light 202 to exit display waveguide 250 by directing the image light 202 to exit display waveguide 250 beyond a critical angle of display waveguide 250 to direct the image light 202 to eyebox region 285.

Scanner 220 may be driven to various scan angles by processing logic 290 based on a virtual image 291 that is to be presented to a user of the head mounted display. Hence, scanner 220 may scan out the virtual image 291 to eyebox region 285 by directing the image light 202 to various scan points within eyebox region 285. The various scan angles of scanner 220 may correspond to different x-y coordinates on input coupler 255, different x-y coordinates on display output coupler 257, and/or different diffraction angles in order to deliver the image light 202 to a particular scan point in a particular time frame. Scanner 220 may include a micro-electro-mechanical systems (MEMS) scanner having a reflective surface that can be moved/adjusted along two rotation axes.

Input coupler 255 may be a diffractive optical element. Input coupler 255 may be configured to diffract specific wavelength bands of image light 202. In an implementation, image light 202 includes narrow-band red light, narrow-band green light, and narrow-band blue light and input coupler 255 is configured to diffract the narrow-band red light, narrow-band green light, and narrow-band blue light into display waveguide 250 while passing (undiffracted) other wavelengths of light such as infrared light.

Figure 2B:
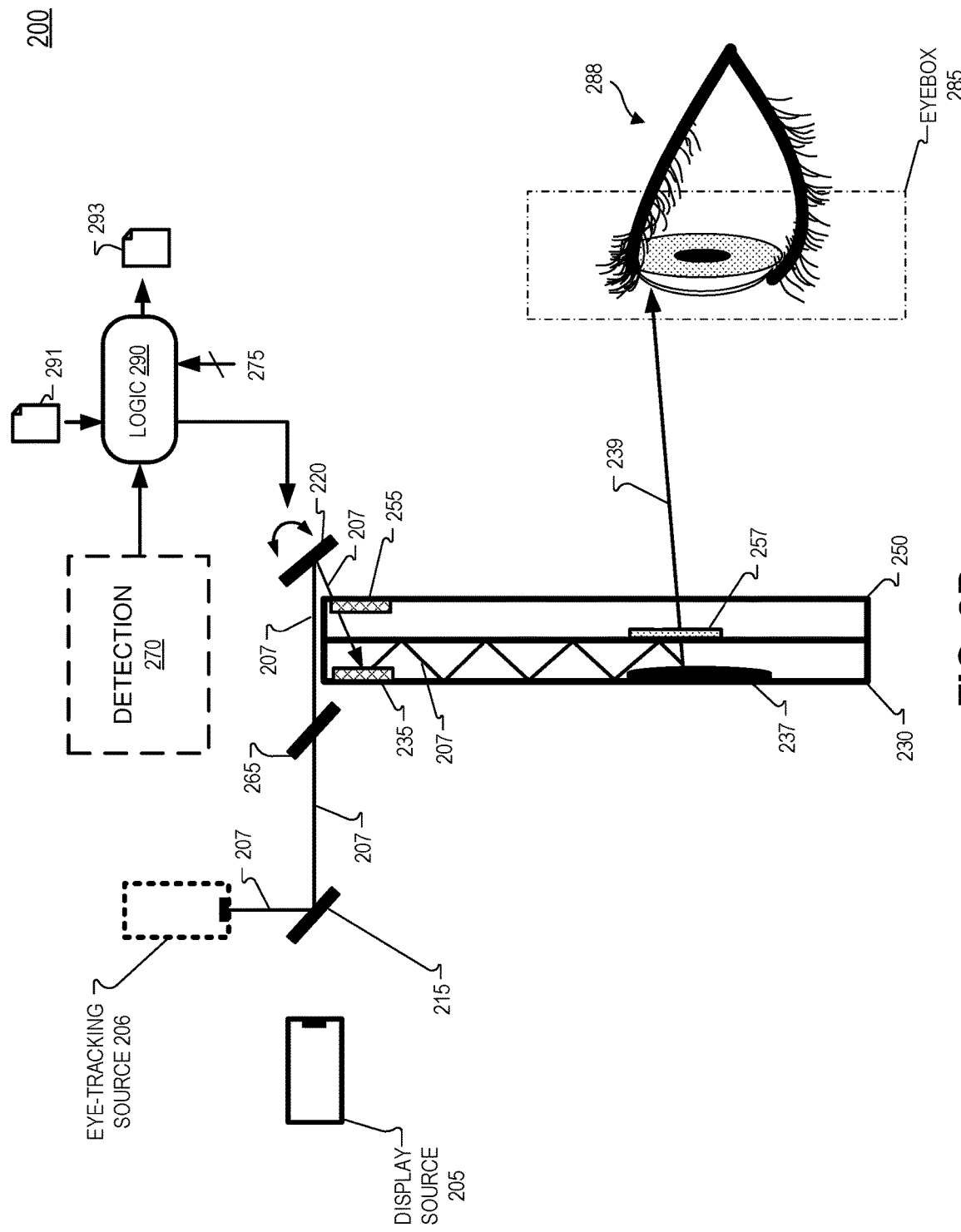
FIG. 2B illustrates an eye-tracking illumination path of a near-eye system, in accordance with aspects of the disclosure.

FIG. 2B illustrates an eye-tracking illumination path of near-eye system 200, in accordance with implementations of the disclosure. In operation, eye-tracking light source 206 emits infrared light 207. Infrared light 207 may be near-infrared light. Eye-tracking light source 206 may include an infrared light source that emits infrared light. The infrared light source may be an LED or a laser, for example. The infrared light source may be a near-infrared light source. Infrared light 207 may be collimated light. Infrared light 207 may have a linewidth less than 1 nm in some implementations.

Infrared light 207 encounters optical element 215 subsequent to being emitted by eye-tracking light source 206. Optical element 215 directs infrared light 207 to scanner 220 through optical element 265. Optical element 215 may be a dichroic reflector that passes visible light and reflects infrared light. Optical element 215 may reflect the specific wavelength of infrared light 207 emitted by an infrared light source included in eye-tracking light source 206 while passing the wavelengths of image light 202.

Infrared light 207 encounters optical element 265 prior to propagating to scanner 220, in the illustrated example. Optical element 265 may be a beam splitter. Optical element 265 may be a dichroic beam splitter that passes almost all visible light and splits the infrared light wavelength associated with infrared light 207. Hence, optical element 265 may pass image light 202 and reflect a portion of infrared light 207.

The portion of infrared light 207 that propagates through optical element 265 encounters scanner 220 and is directed to the input coupler 255 of display waveguide. Input coupler 255 passes the infrared light 207 to eye-tracking waveguide 230. In some implementations, input coupler 255 diffracts infrared light 207 to eye-tracking waveguide 230 at an angle that is not conducive to TIR within display waveguide 250. In some implementations, eye-tracking input coupler 235 of eye-tracking waveguide 230 receives the infrared light 207 from scanner 220 through input coupler 255. In the illustrated implementation, input coupler 255 passes infrared light 207 (undiffracted) to an eye-tracking input coupler 235. In other implementations, input coupler 255 may redirect the infrared light 207 to eye-tracking input coupler 235. Input coupler 255 may diffract the infrared light 207 to eye-tracking input coupler 235.

Eye-tracking input coupler 235 may direct infrared light 207 into eye-tracking waveguide 230 so that infrared light 207 is guided to eye-tracking output coupler 237. Eye-tracking output coupler 237 directs the infrared light 207 to eyebox region 285 as infrared illumination light 239. Output coupler 237 may be a two-dimensional output coupler where the exit angle of infrared illumination light 239 is dependent on the position and/or angle that infrared light 207 becomes incident on output coupler 237.

In some implementations, scanner 220 directs the image light 202 of FIG. 2A and the infrared light 207 of FIG. 2B to input coupler 255 contemporaneously. This may result in image light 202 and infrared illumination light 239 illuminating the eyebox region 285 simultaneously. In an implementation, scanner 220 directs image light 202 and infrared light 207 to input coupler 255 sequentially and display light source 205 and eye-tracking source 206 are selectively activated to synchronize with scanner 220.

Figure 2C:
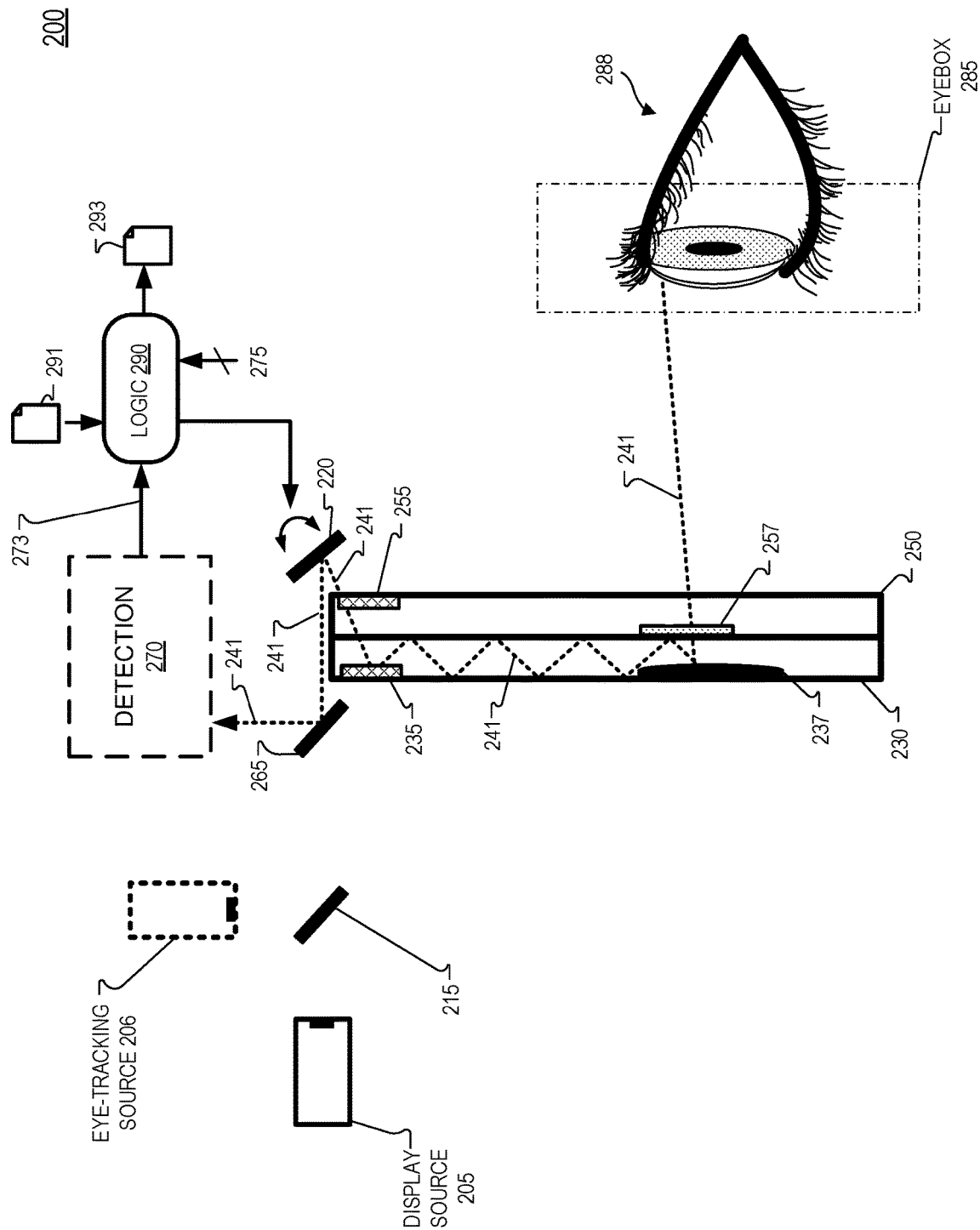
FIG. 2C illustrates a sensing path of near-eye system, in accordance with aspects of the disclosure.

FIG. 2C illustrates a sensing path of near-eye system 200, in accordance with implementation of the disclosure. Near-eye system 200 may include a double-pass feature that includes returning infrared light 241 (reflected or scattered from eyebox region 285) propagating along a reverse optical path of the infrared light 207 propagating in eye-tracking waveguide 230. Returning infrared light 241 is the portion of infrared illumination light 239 being reflected or scattered by eye 288 (or skin/eyelashes around eye 288) back to output coupler 237 in a reverse optical path of the infrared illumination light 239 illustrated in FIG. 2B. Returning infrared light 241 may be incident on output coupler 237 at a same position as infrared illumination light 239 exited output coupler 237 and output coupler 237 may direct returning infrared light 241 to propagate in waveguide 230 toward input coupler 235. Input coupler 235 may direct returning infrared light 241 back to scanner 220 which reflects the returning infrared light to optical element 265. Given the speed of light, scanner 220 is in the same scan position (same scan angle) when infrared light 207 of FIG. 2B is reflected by scanner 220 and when returning infrared light 241 is reflected by scanner 220.

FIG. 2C illustrates that optical element 265 (e.g. a beam splitter) directs at least a portion of returning infrared light 241 to detection module 270. Detection module 270 is configured to generate a tracking signal 273 in response to returning infrared light 241 becoming incident on a sensor included in detection module 270. The returning infrared light 241 propagates to the sensor via scanner 220 and via output coupler 237.

Processing logic 290 receives the tracking signal(s) 273 from detection module 270. Processing logic 290 may be communicatively coupled to scanner 220 to drive scanner 220 to various scan angles. Detection module 270 may generate a tracking signal 273 corresponding to each of the scan angles that scanner 220 is driven to. These tracking signals 273 may be aggregated by processing logic 290 to generate an eye-tracking image 293. The scan angles of scanner 220 and corresponding scan points in eyebox region 285 may also be used to present a virtual image 291 (by way of image light 202 scanned by way of display waveguide 250) to eyebox region 285. Thus, the varying scan angles of scanner 220 may be used for both presenting the virtual image 291 to eyebox region 285 with visible image light 202 and generating an eye-tracking image with infrared light 207 and returning infrared light 241.

In an implementation, processing logic 290 drives scanner 220 to scan image light to scan points within the eyebox region to generate an eye-tracking image with a plurality of tracking signals corresponding to each of the scan points. In the illustrated implementation of FIGS. 2A-2C, processing logic 290 may be configured to drive scanner 220 to progress through the varying scan angles in a repeatable scan sequence to illuminate scan points in eyebox region 285 with infrared illumination light 239.

While FIGS. 2A-2C provide an example near-eye system 200, there may be various additional optical elements (not particularly illustrated) in various implementations of the disclosure. For example, refractive or diffractive focusing optics and/or mirrors may be used to focus or redirect image light 202 and/or infrared light 207 before and/or after encountering scanner 220.

Figure 3A:
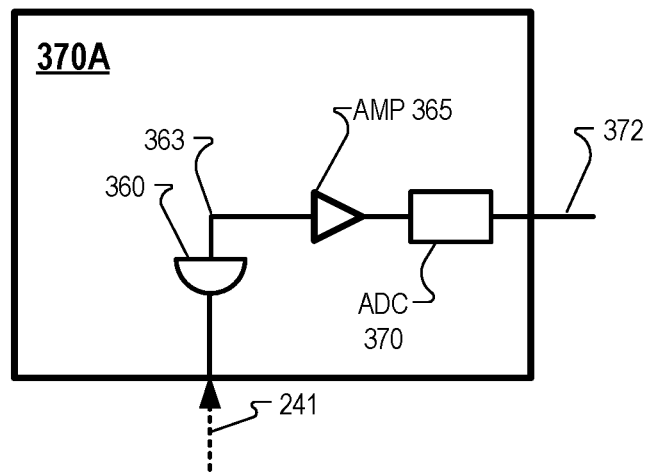
FIGS. 3A and 3B illustrate example detection modules, in accordance with aspects of the disclosure.
Figure 3B:
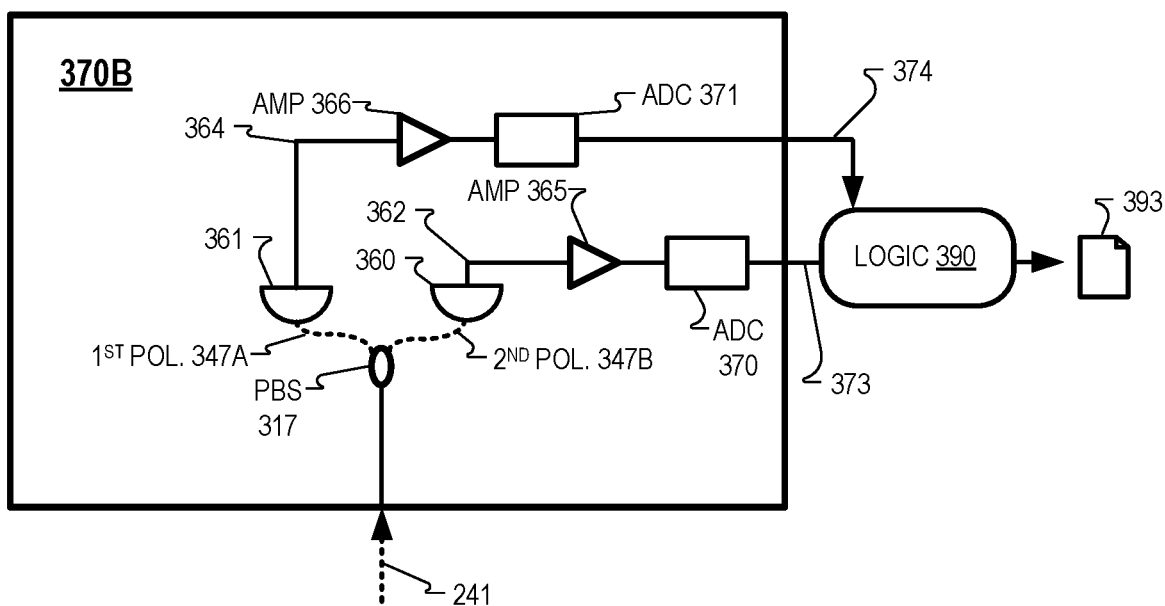

FIGS. 3A and 3B illustrate example detection modules, in accordance with implementations of the disclosure. FIG. 3A illustrates an example detection module 370A that includes a sensor 360, an amplifier 365, and analog-to-digital converter (ADC) 370. Sensor 360 is a light-sensitive sensor. Sensor 360 may include one or more photodiodes. Sensor 360 is configured to generate a tracking signal 363 in response to returning infrared light 241 incident on sensor 360 via scanner 220. Tracking signal 363 may be amplified by amplifier 365 and ADC 370 may generate a digital tracking signal 372 that is provided to processing logic 290. Processing logic 290 may be configured to generate an eye-tracking image 293 based at least in part from tracking signals 372. As scanner 220 scans through illuminating different imaging points of eyebox region 285, tracking signals 363 may be generated by sensor 360 for each imaging point and stored to memory. In an implementation, processing logic 290 is configured to generate an eye-tracking image 293 based at least in part on a plurality of tracking signals that are read-out sequentially from sensor 360 as scanner 220 scans through a plurality of imaging points in eyebox region 285.

FIG. 3B illustrates an example detection module 370B that includes a sensors 360 and 361, amplifiers 365 and 366, and ADCs 370 and 371. Detection module 370B also includes a polarized beam splitter (PBS) 317. PBS 317 receives returning infrared light 241 and splits returning infrared light 241 into a first polarization orientation 347A and a second polarization orientation 347B. The first polarization orientation may be orthogonal to the second polarization orientation.

Sensor 361 receives the first polarization orientation of returning infrared light 241 and is configured to generate a first-polarization tracking signal 364 in response to the first polarization orientation of returning infrared light 241 incident on sensor 361 via scanner 220. First-polarization tracking signal 364 may be amplified by amplifier 366 and ADC 371 may generate a digital first-polarization tracking signal 374 that is provided to processing logic 390.

Sensor 360 receives the second polarization orientation of returning infrared light 241 and is configured to generate a second-polarization tracking signal 362 in response to the second polarization orientation of returning infrared light 241 incident on sensor 360 via scanner 220. Second-polarization tracking signal 362 may be amplified by amplifier 365 and ADC 370 may generate a digital second-polarization tracking signal 373 that is provided to processing logic 390.

Processing logic 390 may be configured to generate one or more eye-tracking images 393 based at least in part on a plurality of first-polarization tracking signals 374 and second-polarization tracking signals 373 that are read-out sequentially from sensor 360 and sensor 361 as scanner 320 scans through a plurality of imaging points in eyebox region 285. Processing logic 390 may be configured to drive scanner 220 of FIG. 2B to progress through the varying scan angles in a scan sequence. Processing logic 390 may generate eye-tracking image(s) 393 based at least in part on digital first-polarization tracking signal 374 and digital second-polarization tracking signal 373.

FIGS. 3A and 3B illustrate example detection modules that may be used as detection module 270 of FIGS. 2A-2C, although additional detection modules may also be used to facilitate additional detection modalities such as direction detection, balanced detection, coherent detection, partially coherent detection, and incoherent detection of returning infrared light 241.

FIGS. 3A and 3B illustrate example detection modules for "double-pass" sensing where eye-tracking waveguide 230 directs infrared illumination light 239 to eyebox region 280 and directs the returning infrared light 241 to a detection module 270 (via scanner 220) for generating an eye-tracking image. Thus, those implementations of the disclosure include illumination of the eyebox region and double-pass sensing to generate eye-tracking image 293. In some implementations of the disclosure, Around-The-Lens event-photodetectors may also be used to generate eye-tracking image 293.

Figure 4A:
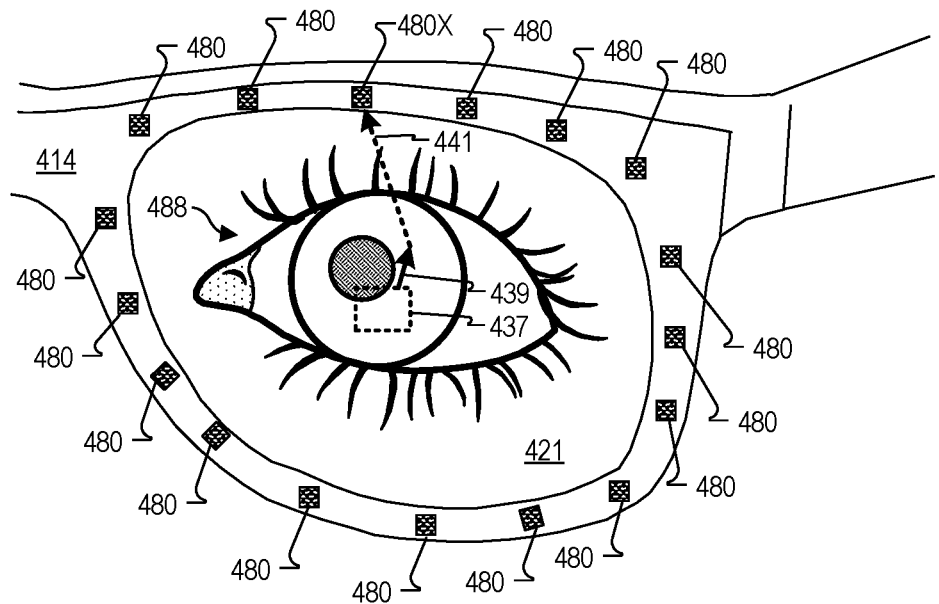

FIGS. 4A-4F illustrate event-photodetectors arranged in an Around-The-Lens configuration of a head mounted device, in accordance with implementations of the disclosure. FIG. 4A illustrates event-photodetectors 480 arranged in a frame 414 around-the-lens of a lens 421 of a head mounted device. The event-photodetectors 480 are configured to receive light reflecting from eye 488 occupying an eyebox region of the head mounted device. Lens 421 includes an output coupler 437 that directs infrared illumination light 439 to an eyebox region that eye 488 occupies. Lens 421 may also include a waveguide (not illustrated) such as waveguide 230 to guide light to output coupler 437. Output coupler 237 is an example implementation of output coupler 437. The illumination light 439 is reflected by the eye (or skin/eyelash in the eyebox) as glint reflection 441. Eye 488 is looking slightly upward and inward (noseward) in FIG. 4A, which may cause the intensity of glint reflection 441 to be great enough to generate an event signal from the event-photodetector 480X while not generating an event signal in the other event-photodetectors in the plurality of event-photodetectors 480.

Figure 4B:
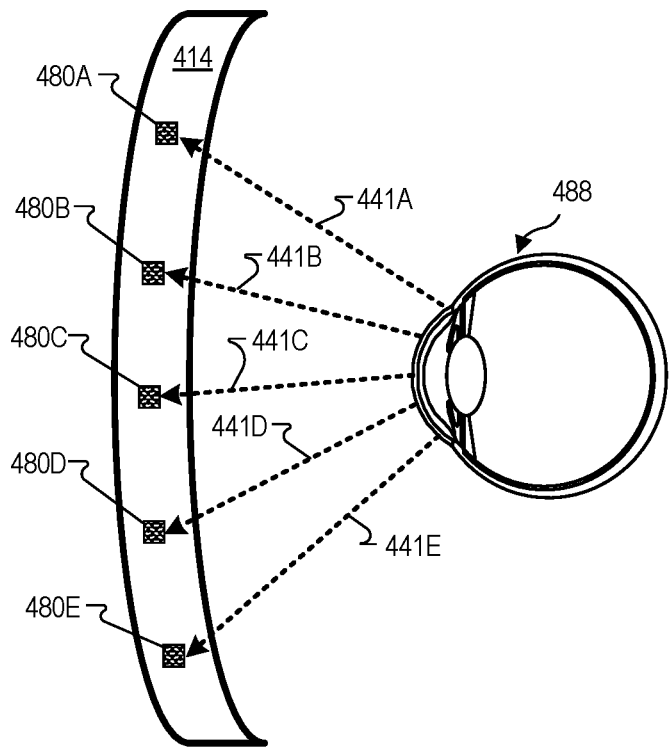

FIG. 4B illustrates an overhead view of event-photodetectors 480A-E and a portion of frame 414. Event-photodetectors 480A, 480B, 480C, 480D, and 480E may be referred to collectively as event-photodetectors 480 and glint reflections 441A, 441B, 441C, 441D, and 441E may be referred to collectively as glint reflections 441. Depending on where eye is positioned, a different glint reflection may generate an event signal from an event-photodetector. By way of example and not limitation, if eye 488 is looking to the far right, it may generate an intensity in glint reflection 441A that triggers an event signal generation by event-photodetector 480A; if eye 488 is looking straight forward, it may generate an intensity in glint reflection 441C that triggers an event signal generation by event-photodetector 480C; and if eye 488 is looking to the far left, it may generate an intensity in glint reflection 441E that triggers an event signal generation by event-photodetector 480E.

Figure 4C:
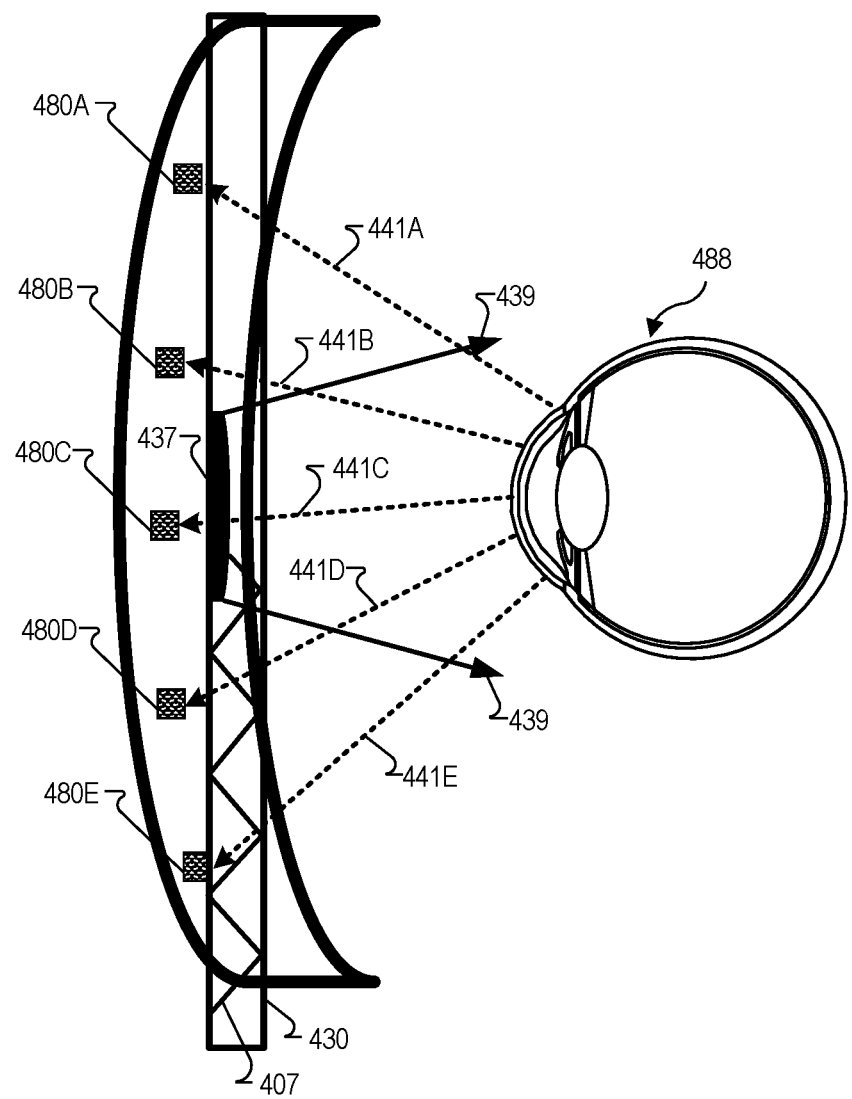

FIG. 4C illustrates a waveguide 430 guiding light 407 to output coupler 437 that directs light 439 to an eyebox region as expanding illumination light 439. The eyebox region is occupied by eye 488. Glint reflections 441 are reflections of expanding illumination light 439.

Figure 4D:
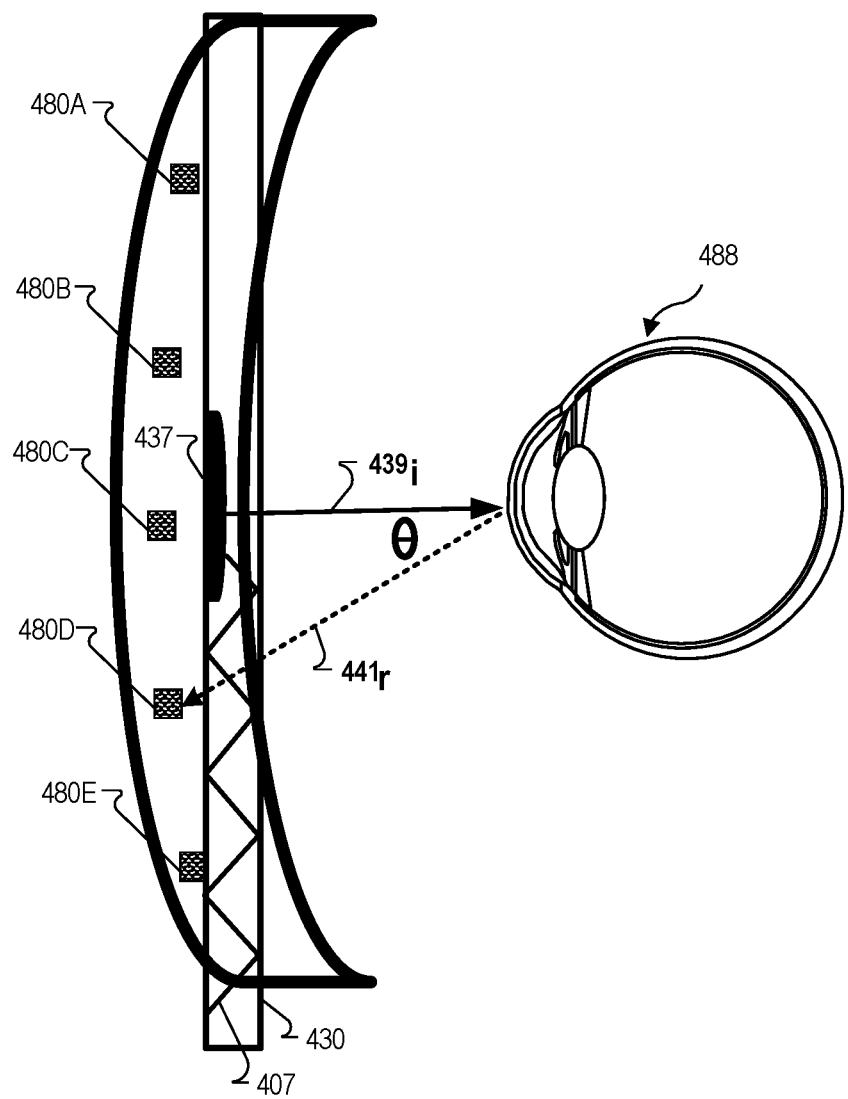

FIG. 4D illustrates that (1) a surface normal of eye 488; and (2) a depth of eye 488 in the eyebox region may be triangulated based on incident vector $439_i$, reflected vector $441_r$, and calculated angle θ. At any given time, the incident vector $439_i$, is known based on the scan angle of the scanner (e.g. scanner 220). And, if an event signal is generated by event-photodetector 480D, the reflected vector $441_r$ has an intensity above a threshold level that may require the surface normal of the cornea of eye 488 to be pointed in a particular direction. Thus, the surface normal and/or depth of eye 488 may be determined.

Figure 4E:
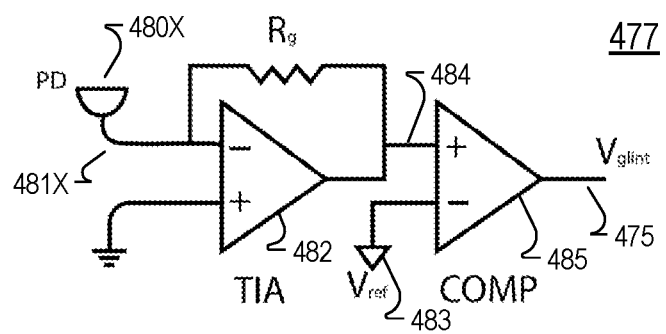

FIG. 4E illustrates an example threshold electrical circuit 477 for setting an event-threshold for an intensity of light. A glint reflection 441 may become incident on event-photodetector 480X and generate a glint signal 481X. The glint signal 481X is provided to an input of a transimpedance amplifier (TIA) 482 having a gain $R_g$. The amplified glint signal 484 is then provided to an input of comparator 485. If the amplified glint signal 484 is greater than the $V_{ref}$ 483 provided to the other input of comparator 485, an event signal 475 is generated by threshold electrical circuit 477. Therefore, the event-threshold can be tuned by adjusting $V_{ref}$ 483 of circuit 477. Those skilled in the art understand that circuit 477 is just an example and that other electrical and/or optical circuits may be used to generate event signals according to a particular event-threshold.

Referring to FIGS. 2A, 2B, and 2C, the event signal(s) 475 generated by Around-The-Lens event photodetector(s) 480 may be provided to processing logic 270 as Around-The-Lens event signals 275. In some implementations, processing logic 270 generates eye-tracking image 273 in response to (1) Around-The-Lens event signal(s) 275 and; (2) tracking signal(s) 273. In this implementation, infrared illumination light 239/439 provides the infrared illumination light for the double-pass sensing of FIG. 2C and for the event signal(s) 275/475 generated in association with FIGS. 4A-4F.

In an implementation, the Around-The-Lens event photodetector(s) 480 of FIGS. 4A-4F replaces the double-pass sensing path and detection module 270 of FIG. 2C. In this implementation, scanner 220 still provides the infrared illumination light 239 to illuminate eyebox region 285 consistent with FIG. 2B. In some implementations, an eye-tracking camera that captures images of eye 288 is also used to augment the event signals 475 generated in FIGS. 4A-4F.

Event-photodetectors described in the disclosure may be photodiodes, silicon photomultipliers, heterojunction phototransistors, and/or avalanche photodiodes. In some implementations, the event-photodetectors are configured to be sensitive to dark field scatter. In some implementations, the event-photodetectors have differing polarizers disposed over the event-photodetectors so that a portion of the plurality of photodetectors are sensitive to different polarization orientations of glint reflections 441. In some implementations, the event-photodetectors may include angle-sensitive photodetectors.

FIG. 4F illustrates an example quad sensor 490 that may be used as an angle-sensitive photodetector. Example quad sensor 490 includes quadrature Q1, quadrature Q2, quadrature Q3, and quadrature Q4. By measuring the intensity of the signal of the four quadratures, a positioning of the glint reflections 441 with respect to a middle 494 of the sensor 490 can be determined. When a particular glint reflection 441 is centered with respect to the middle 494, each quadrature may output a same signal level, for example. When a particular glint reflection is not centered with respect to middle 494, the signals from the different quadratures will increase and decrease with respect to the intensity of the glint reflection incident on the particular quadrature. Thus, an angle-sensitive photodetector for one or more of event-photodetectors 480 can provide even more granular information of the surface-normal of eye 488.

Figure 5:
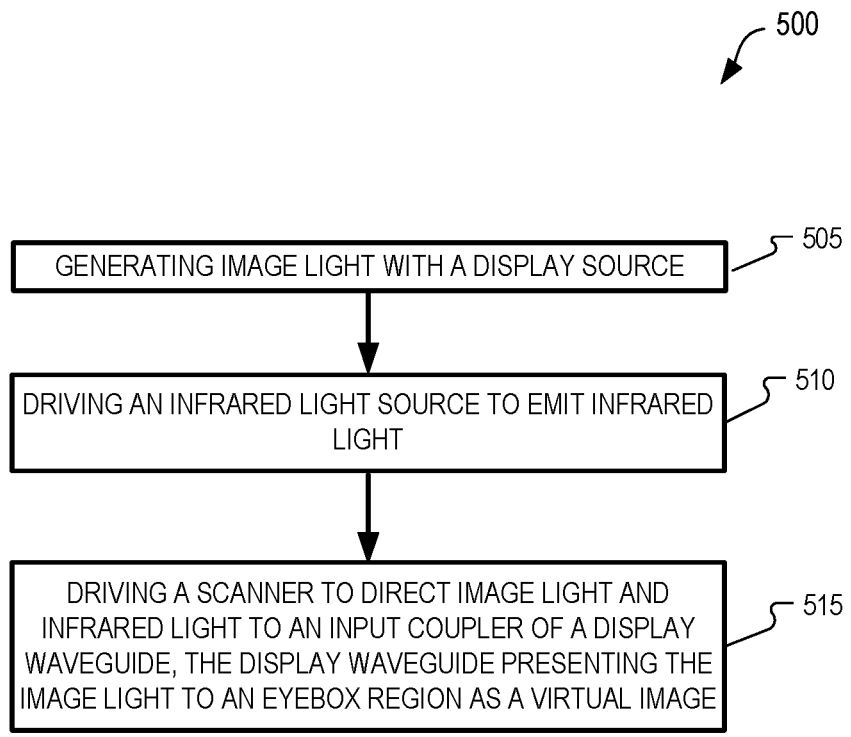
FIG. 5 illustrates an example flow chart of a process of driving a scanner to direct image light and infrared light, in accordance with aspects of the disclosure.

FIG. 5 illustrates an example flow chart of a process 500 of driving a scanner to direct image light and infrared light, in accordance with implementations of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. Process 500 is a computer-implemented method and all or a portion of process 500 may be executed by processing logic 290 or 390, for example. In some implementations, processing logic 290 or 390 are coupled to eye-tracking light source 206 and display light source 205 to execute process 500.

In process block 505, image light is generated with a display light source (e.g. display light source 205). The image light is visible light. The image light may have a red, green, and blue component, in some implementations.

In process block 510, an infrared light source (e.g. source 206) is driven to emit infrared light.

In process block 515, a scanner (e.g. scanner 220) is driven to direct the image light and the infrared light to an input coupler of a display waveguide (e.g. waveguide 250). The display waveguide presents the image light to an eyebox region as a virtual image.

The scanner may direct the image light and the infrared light to the input coupler contemporaneously. In an implementation of process 500, the input coupler of the display waveguide incouples the image light into the display waveguide by diffracting the image light and the infrared light passes through the input coupler undiffracted. In an implementation, driving the scanner includes driving the scanner to different scan angles to present the virtual image to the eyebox region.

In an implementation, process 500 further includes directing the infrared light to an eyebox region as infrared illumination light (e.g. light 239) with an eye-tracking waveguide and the eye-tracking waveguide receives the infrared light from the input coupler (e.g. coupler 255) of the display waveguide.

In an implementation, process 500 further includes generating a tracking signal in response to returning infrared light incident on a sensor via the scanner. The infrared illumination light scatters or reflects from the eyebox region as the returning infrared light.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 290 or 390) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), FC (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye system comprising:
    a light source configured to emit image light, wherein the image light is visible light;
    an infrared light source configured to emit infrared light;
    a display waveguide including an input coupler;
    an eye-tracking waveguide including an output coupler; and
    a scanner configured to direct the image light and the infrared light to the input coupler of the display waveguide, wherein the input coupler is configured to:
      incouple the visible light into the display waveguide to present a virtual image to an eyebox region; and
      direct the infrared light to the eye-tracking waveguide, wherein the output coupler of the eye-tracking waveguide directs the infrared light to the eyebox region as infrared illumination light.

2. The near-eye system of claim 1, wherein the scanner directs the image light and the infrared light to the input coupler contemporaneously.

3. The near-eye system of claim 1, wherein the scanner directs the image light and the infrared light to the input coupler sequentially.

4. The near-eye system of claim 1, wherein the input coupler of the display waveguide incouples the image light into the display waveguide by diffracting the image light, and wherein the infrared light passes through the input coupler undiffracted.

5. The near-eye system of claim 1, wherein the input coupler of the display waveguide incouples the image light into the display waveguide by diffracting the image light, and wherein the input coupler redirects the infrared light to an eye-tracking input coupler of the eye-tracking waveguide.

6. The near-eye system of claim 5, wherein the input coupler diffracts the infrared light to the eye-tracking input coupler of the eye-tracking waveguide.

7. The near-eye system of claim 1, wherein the eye-tracking waveguide includes an eye-tracking input coupler, and wherein the eye-tracking input coupler receives the infrared light through the input coupler.

8. The near-eye system of claim 1, wherein the output coupler is a holographic optical element (HOE), and wherein the light source includes a red light source, a green light source, and a blue light source.

9. The near-eye system of claim 1 further comprising:
    a detection module configured to generate a tracking signal in response to returning infrared light incident on a sensor via the scanner and via the output coupler, the infrared illumination light scattering or reflecting from the eyebox region as the returning infrared light.

10. The near-eye system of claim 9, wherein the output coupler is configured to incouple the returning infrared light into the eye-tracking waveguide, and wherein the eye-tracking waveguide is configured to guide the returning infrared light to the sensor in a reverse optical path of the infrared light propagating through the eye-tracking waveguide.

11. The near-eye system of claim 9 further comprising:
    processing logic communicatively coupled to the scanner, wherein the processing logic drives the scanner to scan the image light to points within the eyebox region to generate an eye-tracking image with a plurality of tracking signals corresponding to each of the points, the tracking signals generated by the detection module.

12. The near-eye system of claim 1 further comprising:
    processing logic configured to drive the scanner to direct the image light to the input coupler at different scan angles to present a virtual image to the eyebox region.

13. The near-eye system of claim 1 further comprising:
    an array of Around-The-Lens event-photodetectors configured to generate event signals in response to glint reflections incident on an event-photodetector in the array of Around-The-Lens event-photodetectors, the infrared illumination light scattering or reflecting from the eyebox region as the glint reflections.

14. A computer-implemented method comprising:
    generating image light with a display light source, wherein the image light is visible light;
    driving an infrared light source to emit infrared light;
    driving a scanner to direct the image light and infrared light to an input coupler of a display waveguide, wherein the display waveguide presents the image light to an eyebox region as a virtual image; and
    directing the infrared light to an eyebox region as infrared illumination light via an eye-tracking waveguide, wherein the eye-tracking waveguide receives the infrared light from the input coupler of the display waveguide.

15. The computer-implemented method of claim 14 further comprising:
    generating a tracking signal in response to returning infrared light incident on a sensor via the scanner, wherein the infrared illumination light scatters or reflects from the eyebox region as the returning infrared light.

16. The computer-implemented method of claim 14, wherein the scanner directs the image light and the infrared light to the input coupler contemporaneously.

17. The computer-implemented method of claim 14, wherein the input coupler of the display waveguide incouples the image light into the display waveguide by diffracting the image light, and wherein the infrared light passes through the input coupler undiffracted.

18. The computer-implemented method of claim 14, wherein driving the scanner includes driving the scanner to different scan angles to present the virtual image to the eyebox region.

19. A head mounted device comprising:
 a light source configured to emit image light, wherein the image light is visible light;
 an infrared light source configured to emit infrared light;
 a display waveguide including an input coupler;
 an eye-tracking waveguide including an eye-tracking input coupler and an output coupler; and
 a scanner configured to direct the image light and the infrared light to the input coupler of the display waveguide, wherein the input coupler of the display waveguide is configured to:
  incouple the visible light into the display waveguide to propagate the visible light within the display waveguide to present a virtual image to an eyebox region; and
  direct the infrared light to the eye-tracking input coupler of the eye-tracking waveguide to propagate the infrared light within the eye-tracking waveguide towards the output coupler of the eye-tracking waveguide, wherein the output coupler of the eye-tracking waveguide directs the infrared light to the eyebox region as infrared illumination light.

20. The head mounted device of claim 19, wherein the input coupler of the display waveguide incouples the image light into the display waveguide by diffracting the image light, and wherein the infrared light passes through the input coupler of the display waveguide undiffracted.

* * * * *